UNITED STATES PATENT OFFICE.

CLAYTON OLIN NORTH, OF AKRON, OHIO, ASSIGNOR TO THE GOODYEAR TIRE & RUBBER COMPANY, OF AKRON, OHIO, A CORPORATION OF OHIO.

METHOD OF COMPOUNDING OF RUBBER PRODUCTS.

1,399,789.

Specification of Letters Patent. Patented Dec. 13, 1921.

No Drawing. Application filed June 11, 1920. Serial No. 388,299.

*To all whom it may concern:*

Be it known that I, CLAYTON OLIN NORTH, a citizen of the United States, and resident of Akron, Ohio, have invented new and useful Improvements in Methods of Compounding of Rubber Products, of which the following is a specification.

My invention relates to the art of preparing a rubber compound and especially to a method of incorporating a fine powder therein.

The nature, objects, and advantages of the invention, as well as the method of procedure, will be fully understood from this specification and its claims, wherein the invention is clearly defined.

Rubber goods, as manufactured at the present time, frequently contain a variety of ingredients which are added for various specific purposes. One class of such substances which is often used are the rosins, mineral rubber, and the like which are plastic in nature and so flux into the rubber mass readily during the compounding and subsequent heating of vulcanization and because of this do not require any special treatment. A second class of substances are compounds such as barytes and zinc oxid and also carbon black which are non-plastic and which may give added strength or wearing qualities to the rubber compound. It frequently happens, however, that lampblack, gas black, or broadly, carbon black do not impart their maximum desirable properties in a rubber compound when mixed with rubber in the usual way.

Substances of the types just mentioned have in the past been added to rubber after the latter has been more or less softened or "broken down" on the mixing rolls and the entire mass together with other ingredients have been mixed until the greatest possible degree of homogeneity has been produced. This method has not, however, produced in every case the highest quality product that is possible. If the ingredients are not uniformly distributed or admixed, or if any of the ingredients are in a coarse state of dispersion, a lack of uniformity in the product and a much poorer quality of product results.

In a patent application for compounding of rubber products, filed October 25, 1918, by R. C. Hartong (Serial No. 259,690), assigned to the Goodyear Tire & Rubber Co., there is disclosed a process of improving the quality of rubber compounds in which the compounding or mixing of the rubber composition is divided into two steps or stages, so that the mixing of a powdery or fine material into the rubber follows its prior dissemination through an emulsified solution of a gel-forming proteid such as glue. By using this method of mixing it is stated that a product is formed which, after vulcanization, possesses a higher tensile strength and increased wearing qualities over a rubber compound produced by the methods in common use. This process especially applies in the case of carbon blacks which initially exist in a light powdery and easily compressible form.

The emulsification of the solution of the gel-forming proteid as disclosed in the referred to application has been brought about by means of pine oil, a portion of which will remain in the finished rubber product. It has now been found that if the emulsification of the glue solution be brought about with some agent which is readily and completely volatile so that it may be removed from the rubber mix before the vulcanization of the same, a product of better quality and more desirable properties results.

Aqueous solutions of various substances such as gums, casein, soap and similar materials of a colloidal nature which have the property of forming gels when dissolved may be used in my process, but I have found that the properties peculiar to glue make it of especial value in the practice of my invention.

The value of carbon black or other finely divided solid compounding ingredients in a rubber mix is therefore much enhanced if the black or other ingredient be treated in the following manner:

Glue is brought into solution or into the form of an emulsion, paste or gel by the use of water; and to this solution or gel which is emulsified with some substance, preferably of a boiling point near or below that of water, there is added any finely divided solid or powder constituent which it is desired to have introduced into and disseminated through the rubber mix. Owing to the more or less fluid condition of the glue solution or gel, it is possible to effect a thorough intermixture of the powder with the glue solution. After the mass has been completely stirred the larger agglomerates of the powder are disintegrated into smaller divisions which are homogeneously admixed with and completely distributed throughout the glue solution, thus reducing to a great extent the chance of the particles from agglomerating together. The mixture may then be incorporated into the rubber on the mixing mill, where, owing to the presence of the carrier liquid, the thorough dissemination and dispersion of the glue-gel-mixture through the mass of rubber is effected with a minimum amount of mechanical manipulation.

The completed mixture may then be subjected to a drying process, preferably to the action of a vacuum drier, to remove the water prior to the vulcanization of the rubber. It is possible, however, to completely dry the mixture by other methods such, for example, as by continuing the milling process for the desired or necessary amount of time.

As an example of the process according to the present invention, the following may be given:

50 pounds of air dry glue are dissolved in 80 pounds of water by the application of heat, if necessary, and to the resulting solution there are added 2 pounds of benzol. To this glue solution, emulsified with benzol or other equivalent substances as described, there are added with stirring, 100 pounds of carbon black. This operation may be carried out in any practical manner but preferably in a closed vessel in order to avoid the very objectionable dusting of the dry black. When the carbon black has been thoroughly mixed into the emulsified glue solution, the latter is incorporated with the rubber on a mixing mill. The product is then dried in any desirable manner. It is, of course, possible to add any other pigment or filler, for example, zinc oxid in place of the carbon black or together with it, which one may desire to introduce into the rubber in this manner.

For benzol, there may be substituted other corresponding materials which will emulsify the glue solution or gel. It is desirable that this emulsifying agent be slightly soluble in the solvent used, as in this case, an emulsion is more quickly obtained. It is furthermore desirable that the emulsifying agent used, be vaporized at a temperature not far above 100° centigrade in order that a more complete drying of the mix may follow. Toluene might be substituted for benzin.

It is to be understood that the example, as given, is illustrative only and that the invention is not limited to the exact procedure, proportions or materials mentioned therein, nor is it dependent upon the accuracy of theories which I have advanced by way of explanation except in so far as the limitations may be included within the terms of the accompanying claims in which it is my intention to claim all novelty inherent in my invention as broadly as is permissible in view of the prior art.

What I claim is:

1. In the manufacture of rubber goods containing a gel forming substance and a finely divided ingredient, the mixing method which consists in preparing an emulsion of the gel forming substance, by means of a volatile liquid mixing the finely divided ingredient therewith and then incorporating the whole into rubber.

2. In the manufacture of rubber goods containing a gel forming substance and a finely divided ingredient, the mixing method which consists in preparing an emulsion of the gel forming substance by means of benzol, mixing the finely divided ingredient therewith and then incorporating the whole into rubber.

3. In the manufacture of rubber goods containing a gel forming substance and carbon black, the mixing method which consists in preparing an emulsion of the gel forming substance by means of a volatile liquid, mixing the carbon black therewith and then incorporating the whole into rubber.

4. In the manufacture of rubber goods containing a gel forming substance and carbon black, the mixing method which consists in preparing an emulsion of the gel forming substance by means of benzol, mixing the carbon black therewith and then incorporating the whole into rubber.

5. In the manufacture of rubber goods containing a gel forming proteid and a finely divided ingredient, the mixing method which consists in preparing an emulsion of the proteid by means of a volatile liquid, mixing the finely divided ingredient therewith and then incorporating the whole into the rubber.

6. In the manufacture of rubber goods containing a gel forming proteid and a finely divided ingredient, the mixing method which consists in preparing an emulsion of the proteid by means of benzol mixing the finely divided ingredient therewith and then incorporating the whole into the rubber.

7. In the manufacture of rubber goods containing a gel forming proteid and carbon black, the mixing method which consists in preparing an emulsion of the proteid by means of a volatile liquid mixing the carbon black therewith, and then incorporating the whole into the rubber.

8. In the manufacture of rubber goods containing a gel forming proteid and carbon black, the mixing method which consists in preparing an emulsion of the proteid by means of benzol, mixing the carbon black therewith and then incorporating the whole into the rubber.

9. In the manufacture of rubber goods containing glue and carbon black, the mixing method which consists in preparing an emulsion of glue by means of a volatile liquid, mixing the carbon black therewith and then incorporating the whole into rubber.

10. In the production of rubber goods containing glue and carbon black, the mixing method, which consists in preparing an emulsion of glue and of benzol, mixing the carbon black therewith and then incorporating the whole into the rubber.

11. In the production of rubber goods containing glue and carbon black, the mixing method, which consists in dissolving the glue in water, emulsifying this solution with benzol, adding carbon black thereto and then incorporating the whole into the rubber.

12. In the manufacture of rubber goods containing a gel forming proteid and a finely divided ingredient, the method which consists in dissolving the proteid in water and emulsifying the solution by means of a volatile liquid, mixing the finely divided solid with this emulsion, incorporating the whole into rubber and drying the product.

13. In the manufacture of rubber goods containing glue and carbon black, the method which consists in dissolving the glue in water, emulsifying the solution by means of benzol, mixing the carbon black with this emulsion, incorporating the whole into rubber and drying the product.

14. In the manufacture of rubber goods containing a gel forming proteid and a finely divided ingredient the method which consists in forming a water gel of the proteid, emulsifying the gel with benzol, thoroughly mixing carbon black therein and then incorporating the whole into rubber.

15. In the manufacture of rubber goods containing glue and carbon black, the methof which consists in forming a water gel of the proteid, emulsifying the gel with benzol, thoroughly mixing carbon black therein and then incorporating the whole into rubber.

In witness whereof, I have hereunto signed my name in the presence of two subscribing witnesses.

CLAYTON OLIN NORTH.

Witnesses:
  J. E. KEATING,
  E. C. LEADENHAM.